Jan. 1, 1946.  L. S. KUPERSMITH ET AL  2,392,050
APPARATUS FOR FINISHING BIMETALLIC ARTICLES
Filed Sept. 6, 1943  5 Sheets-Sheet 1
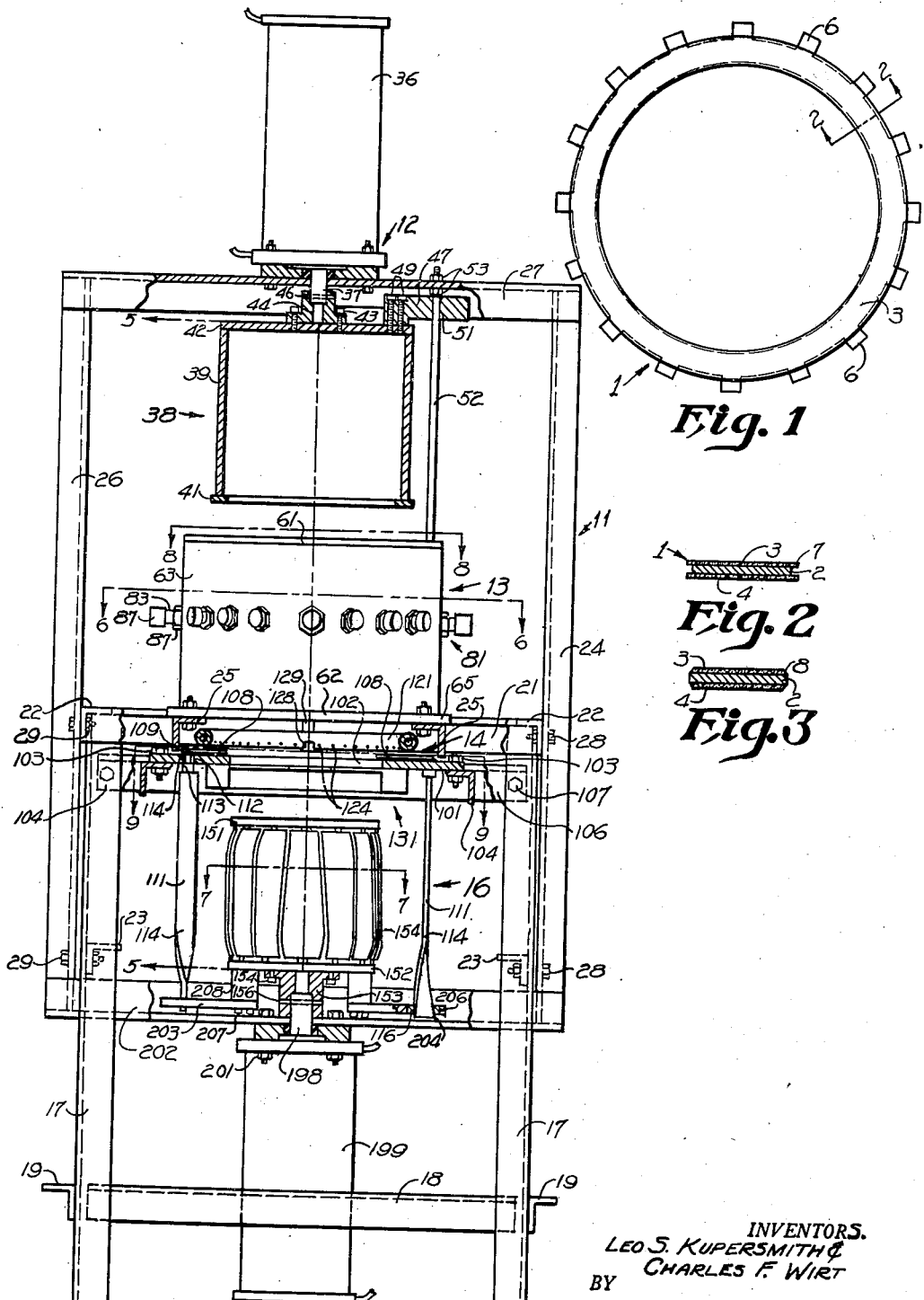
Fig. 1
Fig. 2
Fig. 3
Fig. 4
INVENTORS.
LEO S. KUPERSMITH &
CHARLES F. WIRT
BY
C. Thomas Cox INVENTORS
LEO S. KUPERSMITH &
CHARLES F. WIRT
BY
C. Thomas Cox INVENTORS
LEO S. KUPERSMITH &
CHARLES F. WIRT
BY
C. Thomas Cox Jan. 1, 1946. L. S. KUPERSMITH ET AL 2,392,050
APPARATUS FOR FINISHING BIMETALLIC ARTICLES
Filed Sept. 6, 1943 5 Sheets-Sheet 4

INVENTORS
LEO S. KUPERSMITH &
CHARLES F. WIRT
BY
C. Thomas Cox

Jan. 1, 1946.  L. S. KUPERSMITH ET AL  2,392,050
APPARATUS FOR FINISHING BIMETALLIC ARTICLES
Filed Sept. 6, 1943  5 Sheets-Sheet 5

INVENTORS
LEO S. KUPERSMITH &
CHARLES F. WIRT
BY
C. Thomas Cox

Patented Jan. 1, 1946

2,392,050

UNITED STATES PATENT OFFICE 2,392,050

APPARATUS FOR FINISHING BIMETALLIC ARTICLES

Leo S. Kupersmith, Cleveland Heights, and Charles F. Wirt, East Cleveland, Ohio, assignors to The S. K. Wellman Company, Cleveland, Ohio, a corporation of Ohio Application September 6, 1943, Serial No. 501,422

17 Claims. (Cl. 51—159)

This invention relates to apparatus for trimming or finishing the edge or edges of the facing of bimetallic articles of the type having a sintered powdered metal facing integrally bonded to one or more faces of a reinforcing member or core of solid metal such as steel or copper and in which the facing has sharp or rough edges and is usually coextensive with the core or overhangs the edges thereof at at least one place on the periphery.

One object of the invention is the provision of a new and improved mechanism for finishing such facing edges of bimetallic articles by abrading the edges of the powdered metal facing with a rough surface.

Another object of the invention is the provision of a new and improved mechanism having means for automatically trimming or finishing the facing of a bimetallic article and including novel finishing shoes mounted in a manner whereby the edges of the sintered powdered facing are given a curved or beveled contour in order that chipping or cracking of the marginal portions of the facing in subsequent handling and service will be avoided.

A further object is to provide a new and improved apparatus including exterior and interior finishing means for producing the proper contour on both the inside and outside facing edges of an annular bimetallic article and having novel means to accomplish this result in one operation of the apparatus.

Other and further objects and advantages of the invention will be apparent from the following description taken in conjunction with the accompanying drawings, in which Fig. 1 is a plan view of a typical bimetallic article having unfinished facing edges;

Fig. 2 is an enlarged section on line 2—2 of Fig. 1.

Fig. 3 is a view similar to Fig. 2 but showing the article as finished by the apparatus;

Fig. 4 is a rear elevation, with parts in section, of one embodiment of an apparatus adapted to finish the facing edges of the article of Fig. 1;

Figure 5:
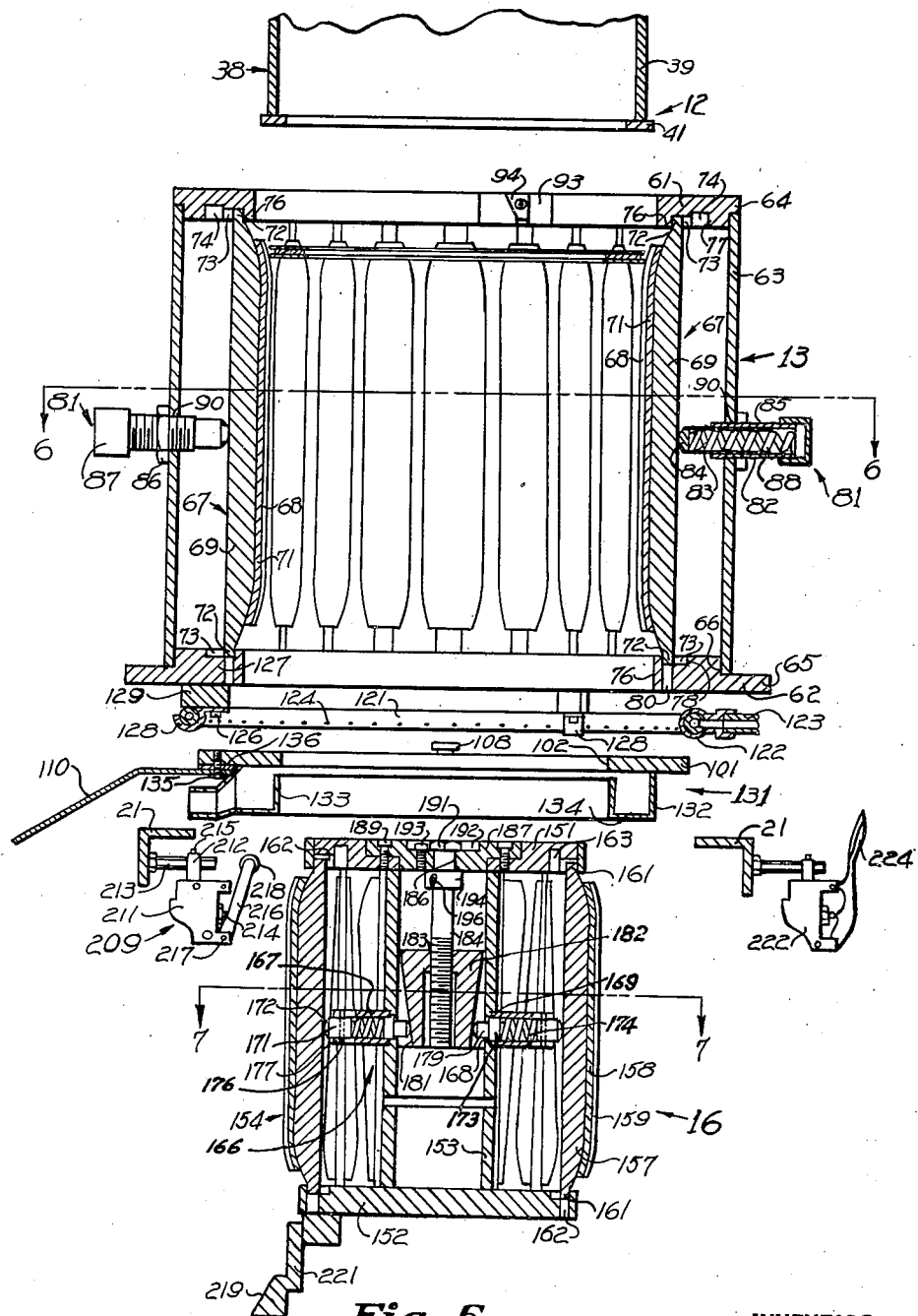
Fig. 5 is a vertical section, on an enlarged scale, taken on line 5—5 of Fig. 4.

In the production of bimetallic articles such as bearings or clutch and brake elements of the type having a sintered powdered metal facing bonded to one or more faces of a reinforcing member or core of solid metal such as steel or copper, it is often customary to construct the articles with the facing of larger area than the face of the core so that it overhangs the edges of the core in order to insure that the complete face of the core is covered. This is particularly true where powdered metals are briquetted separately to form a facing which is then placed on the face of the core and heat treated to sinter the facing and bond it to the core as described in Samuel K. Wellman Patent No. 2,178,527, issued October 31, 1939. This overhanging at the edges cannot be permitted to remain on the finished article if chipping and cracking of the edges of the facing are to be avoided since the facing material is rather brittle, and a blow against the edge thereof will not only remove the overhanging material but also chip or crack the marginal portions of the facing.

The same problem is present in bimetallic articles in which the powdered material is briquetted directly on the core as described in Swartz Patent No. Re. 22,282, issued March 2, 1943, wherein the core is placed in the bottom of a mold, a quantity of powdered material added and the whole subjected to pressure and heat. While this method does not produce any overhanging edges, it does produce a facing that is coextensive in area with the core and that has right-angle edges. These sharp edges are susceptible to chipping and cracking in subsequent handling and use of the bimetallic article.

It has been the practice for the manufacturers of bimetallic articles of the type described above to add a finishing step to the process in order to impart an inclined or rounded contour to the edge of the sintered facing and thus minimize the danger of chipping or cracking if the edge of the article receives a blow or is struck against a hard surface. In the past, this finishing step has been done by hand utilizing a tool such as a knife or file to impart the desired contour. However, this hand operation has been found to be objectionable in that it does not produce a uniform product and is slow, particularly if the article is of irregular configuration. This invention is directed to an apparatus for trimming or finishing the edges of the sintered facing whereby a uniform product is easily and rapidly produced.

Referring now to the drawings, in Figs. 1 and 2 we have illustrated at 1 a typical bimetallic article which the apparatus of this invention is adapted to finish. The article shown is an annular ring having a core 2 of steel to the opposite faces of which are bonded facings 3 and 4 of sintered powdered metal. The ring 1 shown is adapted for use in a brake of an airplane, and the core 2 is provided with lugs or tangs 6 disposed about the periphery thereof in spaced relation to position the ring in the brake assembly.

As is clear from Fig. 2, the facing material overhangs the edges of the core at 7 and is very susceptible to chipping or cracking in service. The apparatus which we will now describe is designed to trim the ring of Fig. 2 to remove this overhanging material and to impart an inclined or rounded contour to the edges as at 8 in Fig. 3.

Referring now to Figs. 4 and 5 in which we have illustrated one suitable apparatus, it will be seen that the mechanism comprises a frame 11 which carries in superposed relation the article advancing unit 12, the outside facing finishing unit 13, the article ejecting unit 14, and the inside facing finishing unit 16. The ring 1 to be finished is inserted in the machine in the space between the article advancing unit 12 and the outside facing finishing unit 13, and after treatment is ejected from the machine by the ejector unit 14 below the unit 13. As will be made clear from the following description, the outside facing finishing unit 13 contains a cylindrical abrasive surface which is adapted to finish the outside edges of the ring as the ring is advanced through the unit by the article advancing unit 12. The inside facing finishing unit 16 contains an exterior roughened cylindrical surface adapted to finish the inside edges of the ring as it is being advanced through the outside facing finishing unit 13.

The frame 11 comprises a base portion of skeleton, box-like configuration formed by the four vertical angle irons 17 which are held in spaced relation by the two pairs of lower horizontal angle irons 18 and 19 and the two pairs of upper horizontal angle irons 21 and 22 which are secured to the vertical angle irons 17 by welding. The angle irons 17, 18, 19, 21, and 22 cooperate to define a regular hexahedron or framework.

Disposed intermediate the longitudinal horizontal angle irons 19 and 22 and parallel therewith are two horizontal angle irons 23 adapted to brace the vertical angle irons 17 and to form supports for the upper unit of the frame 11.

The upper unit of the frame comprises two vertical channel members 24 and 26 secured together at their upper ends by the horizontal channel member 27. The vertical channel member 24 is secured to the horizontal angle members 22 and 23 intermediate the ends thereof by means of bolts 28. The vertical channel member 26 is secured to the other pair of angle irons 22 and 23 intermediate the ends thereof in a similar manner by means of bolts 29.

The upper horizontal channel member 27 forms a support for the article advancing unit 12 which comprises an air-operated cylinder 36 having a piston rod 37 to the lower end of which is secured the hollow pusher or ram 38 formed by the shell 39 and the pusher foot 41 which is welded thereto. The shell 39 is secured at its upper end to a crossbar 42 bolted at 43 to a flange 44 which is secured to the piston rod 37 by means of the pin 46. Disposed at the right hand side of the crossbar 42 and bolted thereto at 49 is an arm 47 provided with an opening 51 for reception of the guide rod 52. This guide rod 52 is secured at its upper end by nuts 53 to the upper horizontal channel member 27 and at its lower end engages a hole in the outside facing finishing unit 13. The arm 47 and guide rod 52 cooperate to prevent rotation of the pusher or ram 38 during its vertical movement.

Figure 6:
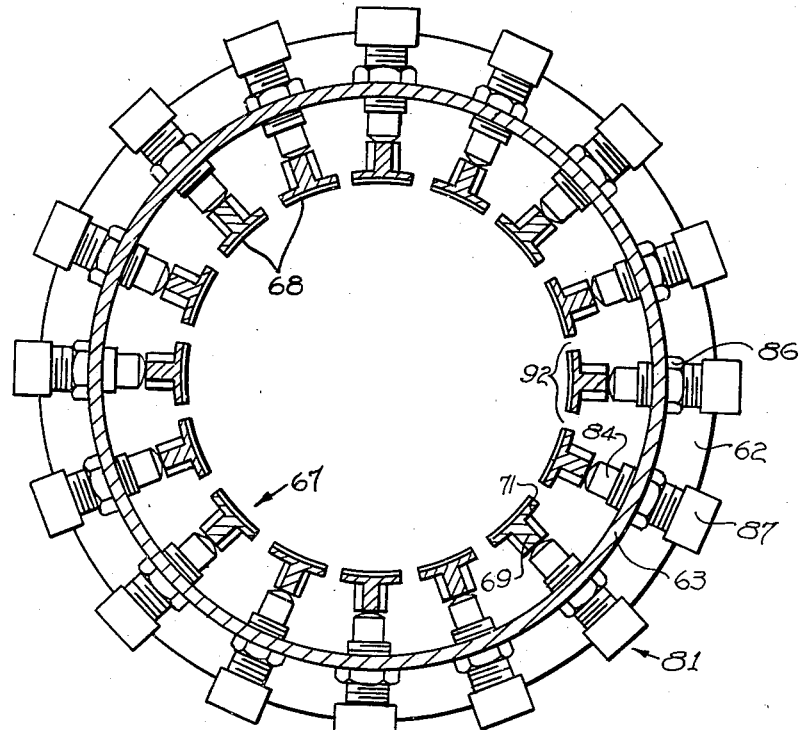
Fig. 6 is a horizontal section taken on line 6—6 of Fig. 5.

Attention is now directed to the outside facing finishing unit 13 which is more fully illustrated in Figs. 5 and 6. This unit comprises a supporting member formed by the upper annular guide ring 61 and the lower annular guide ring or base plate 62 held in spaced relation by securement to the annular shell 63. The shell 63 engages a notch 64 in the upper annular ring 61 and a shoulder 66 on the lower ring 62. The parts 61, 62, and 63 are secured together by welding or other suitable means. Disposed within the interior of the cylindrical space defined by the shell 63 of the supporting member are a spaced series of shoes designated generally as 67. These shoes are provided with rough inner faces 68 which cooperate to define a rough elongated surface or chamber having a shape in cross section substantially the same as the contour of the outer peripehry of the core of the bimetallic article to be moved therethrough by the article advancing unit 12. Each shoe in cross section is of T-shaped formation as is evident from Fig. 6 and comprises a reinforcing portion 69 which forms the stem of the T and a surface portion 71 which forms the head of the T. In the embodiment shown, the rough faces for the shoes are provided by gluing a strip of abrasive cloth 68 to the face of the surface portion 71, but it is obvious that the rough face may be obtained by other means. For example, the surface portion 71 may itself have a rough face similar to that of a file or a rough metal surface may be secured thereto.

As is shown in Fig. 5, the shoe 67 is tapered toward each end thereof and terminates in the extensions 72 which are loosely fitted in radial slots 73 formed in the upper and lower rings 61 and 62. The extensions 72 and slots 73 constitute a guide means for restraining movement of each shoe to a plane at right angles to the roughened surface thereof. The slots 72 of the upper ring 61 are formed with enlarged portions or wells 74 to permit ready removal of the shoes. That is, as the upper extension of the shoe is swung outwardly and raised into the well 74, the lower extension 72 will be raised out of the slot 73 in the lower ring 62 permitting the swinging forward of the lower end of the shoe and removal from the unit.

Each slot 73 is provided at the inner edge thereof with a stop 76 against which the extension 72 is adapted to abut to limit inward or forward movement of the shoe. The rear sides 77 of the wells 74 and the rear sides 78 of the slots 73 of the lower ring 62 serve as stops to limit outward or rearward movement of the shoes. The lower slots 73 are provided with drain holes 80 to allow exit of any dust or abrasive particles.

Means generally designated as 81 are provided to resiliently urge each shoe forwardly against the stops 76. As is shown in Fig. 5, this means comprises a sleeve 82 which receives a spring-pressed hollow plunger 83 having a rounded face 84 for engagement with the rear edge of the reinforcing portion 69 of each shoe. The housing 82 is provided with screw threads 85 on the exterior thereof and is adapted to be inserted into the threaded opening 90 in the drum 63. A lock nut 86 is provided to secure the sleeve 82 in adjusted position.

A cap 87 is threaded on the outer open end of the housing 82 and serves as an abutment for the one end of the spring 88. The other end of the spring 88 engages the round end 84 of the hollow plunger 83 and serves to urge it forward and to press the shoe 67 against the stops 76.

It is apparent that each unit 81 forms a compact spring means for urging the shoe 67 forward and the pressure applied can be adjusted by screwing the housing 82 in and out of the threaded opening 84 in the drum 63. It is, of course, understood that each shoe is provided with a unit 81 and that numerous other types of means to urge the shoes forwardly may be substituted.

As is clear from Fig. 6, the surface portions 71 of the shoes 67 are of arcuate configuration and cooperate to define a cylindrical surface. The surfaces 71 are not contiguous but are separated to provide spaces 92 for reception of the lugs 6 of the bimetallic article of Fig. 1. Thus, the rough surface 68 of each shoe is adapted to engage and remove the facing material on the edge of the article between the lugs.

Figure 8:
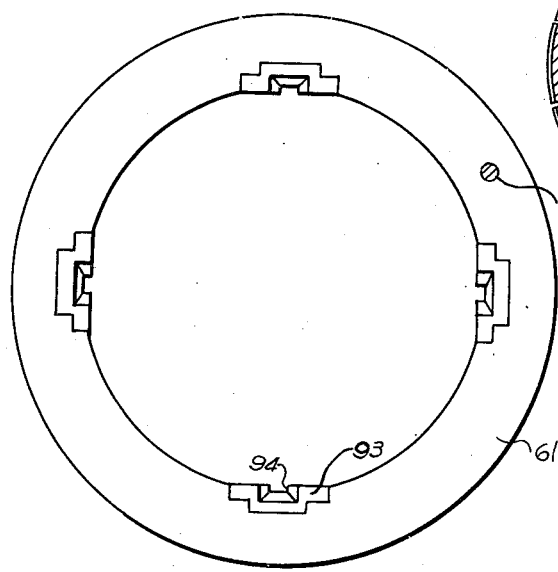
Fig. 8 is a plan view of an element of the unit 13.

In order to insure that the article is properly aligned when inserted in the outside facing finishing unit 13, four guide members 93, see Fig. 8, are secured to the inner face of the upper ring 61. These guide members are provided with tapered slots 94 for reception of four of the lugs 6 of the article. Thus, the operator of the machine may readily drop a bimetallic article into the outside facing finishing unit 13, and it will be properly aligned by means of the slots 94. In Fig. 5, we have shown such an article 1 in the position it assumes when dropped into the unit.

The operation of the apparatus will be described in greater detail hereafter, but it may be observed that the hollow ram 38 of the article advancing unit 12 is utilized to advance to the ring 1 through the outside facing finishing unit 13 in a horizontal position. As the article is advanced through the stripper unit, the abrasive faces 68 of the shoes 67 impart the proper contour to the outer peripheral edges of the sintered facing of the article 1.

The outside facing finishing unit 13 is positioned on angle irons 25 which extend between and are secured to the upper horizontal angle irons 21. As is shown in Figs. 4 and 5, the lower annular ring 62 is provided with a flange 65 for the reception of bolts to secure the unit to the angle irons 25.

Disposed below the outside facing finishing unit 13 is the ejector unit 14 for receiving the bimetallic article from the unit 13 and for ejecting it from the apparatus. This unit comprises a fixed stripping plate or member 101 having a central opening 102 of less diameter than the outside diameter of the bimetallic article 1. This stripping plate 101 constitutes a receiving platform for the article as it comes from the unit 13 and is bolted at 103 to the angle irons 104 which in turn are secured to the angle irons 106. The angle irons 106 are bolted at 107 to the vertical angle irons 17 of the main frame 11.

Figure 9:
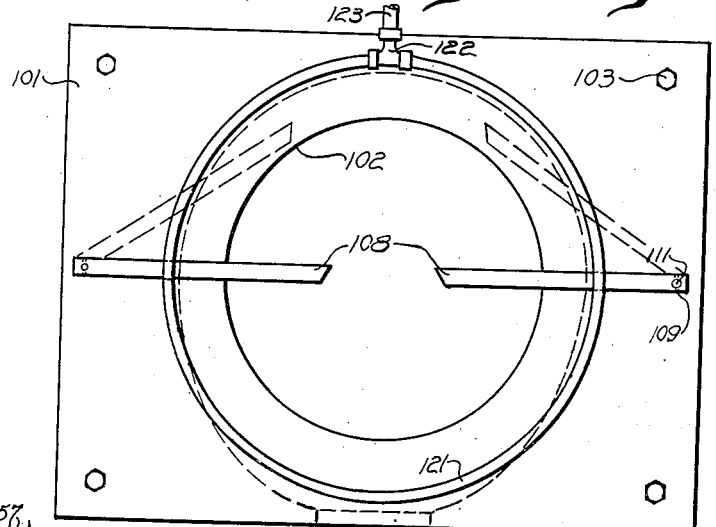
Fig. 9 is a horizontal section, on an enlarged scale, taken on line 9—9 of Fig. 4.

Mounted on the plate 101 for oscillatory movement are a pair of ejector arms 108, see Figs. 4 and 9. Each ejector arm is secured by a pin 109 to a shaft 111 and is adapted to oscillate about the axis of said shaft and over the surface of the plate 101 through a limited amplitude. These arms are adapted to be retracted to permit the bimetallic article to fall onto the plate 101 and are then advanced to eject the article from the apparatus into a receiving chute shown at 110 in Fig. 5.

Each shaft 111 is journaled at 112 in the plate 101 and provided with a shoulder 113 to prevent upward movement thereof. A washer 114 is disposed between the ejector arm 108 and the plate 101 to space the arm a slight distance above the plate. The ejector arm and the pin attachment 109 serve to prevent downward movement of each shaft 111. The lower portion of each ejector arm below the shoulder 113 is of rectangular cross section, and the lower end thereof at 114 is given a 90° twist or turn. The shafts 114 and the ejector arms 108 are oscillated by the vertical movement of the nonrotating guides 116 carried by the inside facing finishing unit 16 and moved vertically thereby, all as will be more fully described below.

Disposed above the ejector arms 108 and the plate 101 is a blower pipe 121, see Figs. 4, 5, and 9. This pipe is of circular formation and of a diameter slightly greater than that of the article to be operated upon and is formed from a tube, which is bent to circular formation and joined to the T fitting 122 which is connected to a source of fluid under pressure such as air through the pipe 123. The pipe 121 is provided with a series of apertures 124 spaced around the inner periphery thereof and directed downwardly at an angle of 45°. The pipe is supported from the lower annular ring 62 of the outside facing finishing unit 13 by means of bolts 126 threaded into holes in the ring 62. The bolt 126 is provided with a pipe strap 128 to hold the pipe against a thick sleeve or washer 129. It is evident that if air is supplied under pressure to the pipe 123, jets of air from the apertures 124 will be directed downwardly and at an inner angle onto the support 101 and will serve to keep it free from dust and debris and to permit free movement of the ejector arms thereover.

Disposed below the plate 101 and secured thereto is a dust collector generally designated as 131 for removing dust and debris from the vicinity of the support 101. This unit comprises an annular sheet metal pan having an outer side formed by the circular member 132 and an inner side formed by the circular member 133 which is joined to the outer member by a bottom 134. The outer member 132 is provided with three equi-spaced apertured lugs 136 adapted to receive bolts 135 which are threaded into the plate 101 to secure the dust collecter thereto. The annular pan formed by the members 132, 133, and 134 is connected at one side thereof with a pipe 138 which in turn is connected to a suitable exhaust and dust collector system for creating a suction therein.

Figure 7:
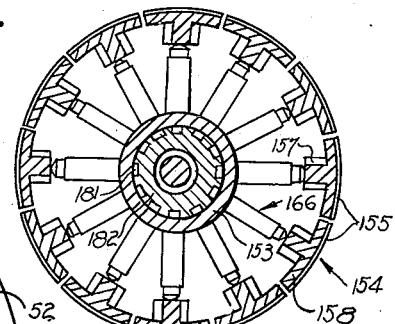
Fig. 7 is a horizontal section taken on line 7—7 of Fig. 5.

Attention is now directed to the inside facing finishing unit 16 which is more fully illustrated in Figs. 4, 5, and 7. This unit comprises a supporting member formed by an upper circular plate 151 and a lower circular plate or base 152 held in spaced relation by securement as by welding to the circular pipe or shell 153. Disposed around the exterior and in effect defining the circumferential surface of the unit 16 are a series of shoes generally designated as 154. These shoes are provided with roughened exterior faces 155 of arcuate configuration which cooperate to define an elongated surface having a shape in cross section substantially the same as the contour of the inner periphery of the article of Fig. 1, this elongated surface being adapted to cooperate with the elongated surface of the outside facing finishing unit 13 to define an annular passage having rough inner and outer surface. Each shoe in cross section is of T-shaped formation as is evident from Fig. 7 and comprises a reinforcing portion 157 which forms the stem of the T and a surface portion 158 which forms the head of the T. In the embodiment shown, the rough face for the shoes is provided by gluing a strip of abrasive cloth 159 to the face of the surface portion 158, but it is obvious that the rough face may be obtained by other means as suggested in connection with the shoes of the outside facing finishing unit 13.

As is shown in Fig. 5, each shoe 154 has a tapered contour at the ends thereof and terminates in extensions 161. These extensions are loosely fitted in radial slots 162 formed in the upper and lower guide plates 151 and 152 with which they cooperate to constitute a guide means for each shoe. The slots 162 of the upper plate 157 are provided with wells 163 at the ends thereof to permit ready removal of the shoes. It is evident that the guide means for these shoes is of substantially the same construction as that used for the shoes of the outside facing finishing unit 13.

Means generally designated as 166 is provided for each shoe to urge the same against the outer ends of the slots 162. As is shown in Fig. 5, this means comprises a sleeve 167 which is secured to the pipe 153 about an opening 168. The sleeve 167 engages a notch 169 in the pipe 153 and is welded thereto and is adapted to receive the spring-pressed plunger 171 which has a rounded front face 172 for engagement with the rear edge of the reinforcing portion 157 of the shoe. The sleeve 167 slidably receives at the inner end thereof an adjustment plunger 173 which serves as an abutment for the spring 174 which urges the plunger 171 forward. The plunger 171 is provided with a pin 176 for reception in slots 177 in the sleeve to prevent rotation. The plunger 173 is provided with a reduced portion 179 on the inner end thereof for engagement with the inclined surface 181 of the adjustment cam 182. It is apparent that vertical movement of the cam 182 serves to adjust the spring pressure on the plunger 171 and the force with which the shoe 154 is urged outwardly.

The cam 182 is slidably received in the pipe 153 and is provided with a threaded opening 183 for reception of an adjusting bolt 184. The bolt 184 extends through a hole 186 in a plate 187 which is bolted at 189 to the upper plate 151. The hexagonal head 191 of the bolt is disposed within a recess 192 and a socket cap screw 193 is provided to prevent rotation of the bolt unless the cap screw is removed. A collar 194 is secured to the bolt by means of a setscrew 196 just below the plate 187 to prevent upward movement of the bolt. By removing the cap screw 193 and rotating the bolt 184 in either direction and to the desired extent, the spring pressure on the shoes may be readily adjusted.

The inside facing finishing unit 16 is mounted for vertical movement by securement to the piston rod 198 of a fluid-operated cylinder 199. The cylinder 199 is bolted at 201 to the lower channel member 202 which in turn is secured at its ends by welding to the vertical channel members 24 and 26. The lower plate 152 of the inside facing finishing unit 16 carries a flange 153 secured thereto by means of bolts 154 and the flange is pinned at 156 to the piston rod 198. It is apparent that the cylinder 199 is adapted to move the inside facing finishing unit 16 to and from the position shown in Fig. 4 and a position where the unit is disposed within the outside facing finishing unit 13.

The lower plate 152 is provided with two outwardly extending arms 203 which at the outer extremities thereof carry the non-rotating guides 116. Each guide 116 comprises a metal insert having a slot 204 for reception of the shaft 111 and is secured in place by means of a setscrew 206. The arms 203 are secured to the plate 152 by means of bolts 207 and are spaced therefrom by sleeves 208.

As is more clearly shown in Fig. 4, the shoes 154 of the inside facing finishing unit 16 are shaped in such a manner that the space between adjacent shoes is inclined from the vertical. Thus, although the friction surface is constituted by a plurality of separate faces 156 which may be spaced apart as shown, relative movement of this surface past the inside of the article of Fig. 1 serves to abrade all portions thereof.

In Fig. 5, we have shown a cam-operated relief valve 209 secured to the upright angle iron 21 near the upper end of the inside facing finishing unit 16. This valve comprises a valve body 211 which carries a sleeve 212 having a hexagonal opening for sliding engagement with the post 213 which is secured to the upright of the frame. The sleeve 212 is held in adjusted position by means of a setscrew 215. The valve body is of usual construction and contains a valve operated by the plunger 214 which is spring pressed toward a closed position. An operating lever 216 is hinged at 217 at one end thereof to the valve body and is provided at the other end with a roller 218. The roller 218 of the valve 209 is adapted to be engaged by the inclined surface 219 of a cam 221 carried by the lower plate 152 of the inside facing finishing unit 16 when the unit 16 has been advanced to its highest position. Two manually operated valves 222, see Fig. 5 in which one of them is shown, are secured in convenient relation on angle iron 21 at the front of the machine and are utilized to control the operation of the mechanism. These valves are identical in construction and mounting with the valve 209 except that a handle 224 is substituted for the roller 218.

Now that the major part of the apparatus has been described as to physical structure, reference should be had to Figs. 10-14 which diagrammatically illustrate the positions assumed by the various parts in the operation of finishing a bimetallic article. The supporting members for the shoes and other structural parts have been omitted to avoid confusion in the drawings. In these figures, we have illustrated in section only one-half of the machine since it is apparent that the parts will be duplicated in the other half. In other words, we have illustrated the operation of only one upper shoe 67 and one lower shoe 154, but it is to be understood that the operation is the same for all of the shoes.

Figures 10, 11, 12, 13, 14:
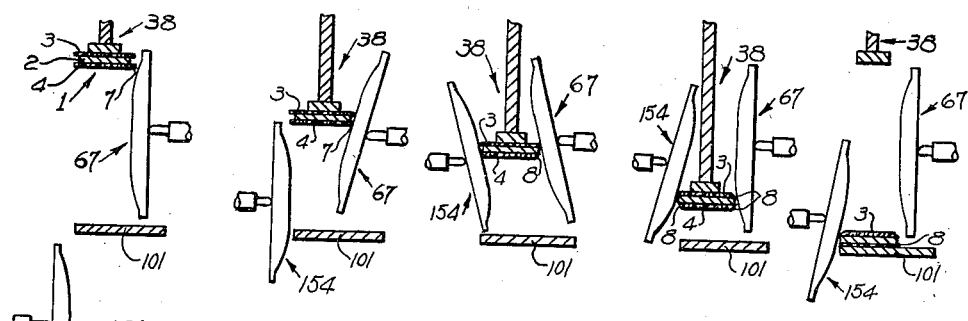
Figs. 10 to 14 are diagrammatic showings of the finishing shoes of the apparatus illustrating the various positions they assume in operation.

Referring now to Fig. 10, there is shown a shoe 67 of the outside facing finishing unit 13 disposed above the stripping plate 101 and a shoe 154 of the inside facing finishing unit 16 disposed below the plate 101. The hollow pusher or ram 38 of the article advancing unit 12 is shown in contact with the article 1 which is in the position it assumes when dropped into the apparatus. As is clear from this figure, both shoes in their normal position have their abrasive or rough faces disposed in such an advanced position that the shoes must be forced back against spring pressure to permit passage of the article 1. During this passage, the rough faces of the shoes will abrade and remove the overhanging edges 7 of the facings 3 and 4. However, the construction of the shoes and their mountings is such that they will assume an inclined position during this abrading operation and impart an inclined or rounded contour to the edges of the facings. Thus in Fig. 11, the ram 38 has advanced the article part way down the length of the shoe 67 which has been forced back against spring pressure due to the fact that the circumference of the article is larger than the circumference of the cylindrical surface defined by the shoe 67 in their normal or advanced position. Since the force applied to the shoe 67 by the article 1 is located above the center of the shoe, the upper end of the shoe will be forced back to a greater extent than the lower end and the shoe will assume an inclined position as shown. While this operation is progressing, the inside facing finishing unit has been advanced until the shoe 154 has assumed the position shown in Fig. 11. As the ram 38 continues to advance, the article is progressed along the shoe 67 and the overhanging edge 7 of the lower facing 4 is removed until the position shown in Fig. 12 is reached. At this point it will be observed that the article has passed the center of the shoe 67 whereupon the shoe now inclines in the opposite direction. In the meantime, the shoe 154 of the inside facing finishing unit has contacted the inside overhanging edge of the lower facing 4, has been forced to assume an inclined position and is abrading off this overhanging edge. The ram 38 continues to advance and forces the article past the center of the shoe 154, as shown in Fig. 13. During this advance, the upper edges of the upper facing 3 are abraded by the shoes 67 and 154. After the apparatus assumes the position shown in Fig. 13, the lower shoe is lowered and the ram raised. As the shoe 154 is lowered, it carries with it the article 1 until the article contacts the stripping plate 101, as shown in Fig. 14. Continued lowering of the shoe 154 strips the article from the lower shoe 154 and leaves it free on the stripping plate 101.

It will thus be seen that the resilient mounting of each shoe in its supporting member causes it to assume constantly changing inclined positions in operation such that it will impart to the edges of the facings a rounded or inclined contour 8. As has been pointed out, edges finished in this manner are less susceptible to chipping and cracking during handling of the article.

The method of operation of the apparatus should be apparent from the above description, but it will be here set forth in the interest of greater clarity. The operator of the machine will drop a bimetallic article into the outside facing finishing unit 13 so that it will assume the position shown in Fig. 5. To accomplish this, he need merely slide an article flatwise between the presser foot 41 of the article advancing unit and the upper plate 61 of the finishing unit 13 and align four of the tangs 6 of the article with the slots 94 of the guides 93 carried by the ring 71 and drop the article in the outside facing finishing unit into contact with the shoes carried by the outer supporting member. The tapered character of the slots 94 serves to make this insertion easier. He will then supply air under pressure to the upper end of the cylinder 36 of the article advancing unit 12 to cause the ram 38 to advance the article through the outside facing finishing unit 13. At the same time, he will admit air to the lower end of the cylinder 199 of the inside facing finishing unit 16 to elevate the shoes 154. The air should be supplied to the cylinder 199 at a slower rate than the cylinder 36 in order that the sequence illustrated in Figs. 10-14 may be attained. When the various parts of the apparatus and the article have reached the position illustrated in Fig. 13, with the shoes 154 at their upper position, the operator will then reverse the movements of the piston rods 37 and 198 by supplying air under pressure to the piston-rod ends of the cylinders 36 and 199. This will retract the ram 38 of the article advancing unit to its normal position and will retract the inside facing finishing unit 16. As the unit 16 is retracted through the stripping plate 101, the article will be stripped or removed from the shoes 154. Shortly after this stripping operation occurs, the ejector arms 108 will move forwardly to eject the finished article from the apparatus. It is, of course, evident from Figs. 4 and 9 that the ejector arms 108 are oscillated by means of the guides 116 carried by the arms 203 of the unit 16. In Fig. 9, the solid lines show the normal position of the ejector arms 108, while the dotted lines show the position the arms assume during the major portion of the movement of the unit 16. The oscillation of the arms from the dotted line to the solid line positions constitutes the ejecting movement. As the arms go through this movement, they forcibly contact the article and eject it from the apparatus.

Figure 15:
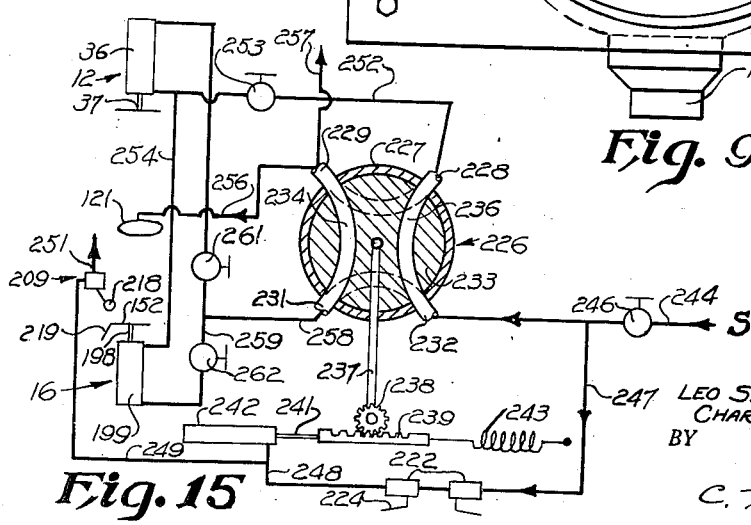
Fig. 15 is a schematic showing of the piping connections of the control system.

The control of the supply of air to the cylinders 36 and 199 may be accomplished through any suitable valve structure; however, we prefer to use the arrangement illustrated in Fig. 15 in which the various valves and pipe connections are shown diagrammatically. The cylinder 36 of the article advancing unit 12 is shown in proper relation to the cylinder 199 of the inside facing finishing unit 16. Disposed between the two units is shown the blower ring 121. The hand-operated valves 222 and the cam-operated valve 209 are adapted to control the operation of a suitable master valve 226 which regulates the supply of air from a source S. The master valve 226 is a four-way valve of the pilot-operated type adapted to cause advance and retraction of the cylinders 36 and 199 and to admit air to the blower ring 121, and it may be mounted anywhere on the frame 11 of the apparatus. This master valve comprises a cylindrical valve body 227 provided with four spaced ports 228, 229, 231, and 232 and receiving a cylindrical valve plug 233 which has the two arcuate passages 234 and 236. The valve plug 233 is adapted to be rotated through one-quarter turn or ninety degrees to move the passages 234 and 236 to the dotted line positions. In the position shown in solid lines, the valve plug connects the port 232 with the port 228 and connects the port 229 with the port 231. In the dotted line position, port 229 is connected to port 228 and port 231 is connected to port 232.

The valve plug is provided with a shaft 237 having a pinion gear 238 at one end thereof meshing with a rack 239 connected to the piston rod 241 of a small air cylinder 242 which is adapted to move the rack to the left. A spring 243 is connected to the right side of the rack 239 and serves to pull it to the right.

Air under suitable pressure from a source S is conveyed by pipe 244 through a shutoff valve 246 to the port 232 and through connecting pipe 247 to the two hand-operated valves 222. These latter valves are in series and connect with pipe 248 which continues this circuit to the piston-rod end of the small air cylinder 242. A pipe 249 connects the pipe 248 to the relief valve 209 which when open will allow the air to exhaust through the exhaust pipe 251.

Two valves 222 are used in order to keep both hands of the operator of the apparatus in a safe place while the ram 38 is being advanced. The connections of the cylinders 36 and 199 and the blower ring 121 to the ports of the master valve 226 are relatively simple. Port 228 is connected by pipe 252 through a throttling valve 253 to the pipe 254 which joins the piston-rod end of cylinder 36 with the piston-rod end of the cylinder 199. Port 229 is connected by a pipe 256 to the blower ring 121 and is also provided with a pipe 257 which has an open end for exhaust to the atmosphere. Port 231 is connected by pipe 258 to the pipe 259 which connects the piston-head ends of the cylinders 36 and 199. Throttling valves 261 and 262 are located in the pipe 259 between each cylinder and its connection to the pipe 258.

Fig. 15 shows the various parts in their normal position with the piston rods 37 and 198 in retracted position and the valves 222 and 209 in closed position. In this condition, air from the pressure source S is supplied to the piston-rod end of each cylinder 36 and 199 through the pipe 244, the arcuate passage 236, the port 228, pipe 252, and pipe 254. This constant supply of air under pressure to the cylinders holds the article advancing unit 12 and the inside facing finishing unit 16 in retracted position.

In operation, the operator of the machine will insert a bimetallic article in place in the outside facing finishing unit 13 and will then open the valves 222. The use of two valves necessitates that the operator shall have withdrawn both of his hands out of danger and to a safe location since the two valves must be operated simultaneously with one hand on each valve. Opening of the valves 222 permits air under pressure from the source S to flow from pipes 247 and 248 to the small air cylinder 242 resulting in movement of the rack 239 to the left, against the tension of spring 243. This movement of the rack rotates the pinion 238 and shaft 237 and moves the valve plug 233 until the arcuate passages 234 and 236 are in dotted line positions. This movement occurs rapidly or almost instantly, and the operator may then release the handles 224 of the valves 222 to close them and maintain pressure in the cylinder 242.

With the valve plug 233 rotated to the dotted line position, air is supplied to the piston end of the cylinders 36 and 199. That is, air under pressure from the source S flows through pipe 244 to the port 232, through the passage 236, the port 231, pipes 258 and 259 to the cylinders 36 and 199. This supply of air under pressure to the cylinders 36 and 199 results in advancement of the piston rod 37 of the article advancing unit and the piston rod 198 of the inside facing finishing unit 16. The throttling valves 261 and 262 are suitably adjusted so that the piston rods advance in the proper relation to secure the steps of operation illustrated in Figs. 10-14. As these piston rods 37 and 198 advance, air is exhausted by the pistons from the piston-rod ends of the cylinders 36 and 199 through the pipe 254, pipe 252, port 228, passage 234, port 229, and pipe 257 which is open to the atmosphere. Part of the exhaust air, however, exhausts from port 229 through the pipe 256 and the blower ring 121. The exhaust of this air through the blower ring serves to blow dust and debris from the stripping plate 191 into the dust collector.

When the piston rod 198 of the inside facing finishing unit 16 has advanced to its highest position, the cam 219 of the lower plate 152 contacts the roller 218 of the valve 209 and opens the same, placing the pipe 249 in communication with the pipe 251 which is open to the atmosphere. The immediate result of this is to release pressure in the air cylinder 242 and permit the spring 243 to pull the rack 239 to the right. This movement of the rack rotates the pinion 238 and valve plug 233 to the position shown in solid lines whereupon air under pressure passes from the supply S through pipe 244, passage 236, and pipes 252 and 254 to the piston-rod ends of the cylinders 36 and 199 and retracts the units 12 and 16 to the normal position. As these units are retracted, air exhausts from the piston ends of the cylinders 36 and 199 through the pipes 259 and 258 and passage 234 to the exhaust pipe 257 and the blower pipe 121.

It is thus seen that the system illustrated in Fig. 10 provides a semi-automatic control for the operation of the apparatus. The operator need only insert the article to be finished into the outside facing finishing unit 13 and momentarily open the valves 222 to properly operate the apparatus. The article advancing unit 12 and the inside facing finishing unit 16 will be advanced and retracted in properly timed relation and the bimetallic article will be finished and ejected from the apparatus. If the operator fails to release the handles 224 of the valves 222 and keeps them open, nothing serious will happen since the piston rods 37 and 198 will merely reciprocate back and forth for a limited movement in their advanced position. The amplitude of this reciprocating movement will usually be small and in most cases, only one-half inch and will indicate to the operator that he must release the handles 224.

Figure 17:
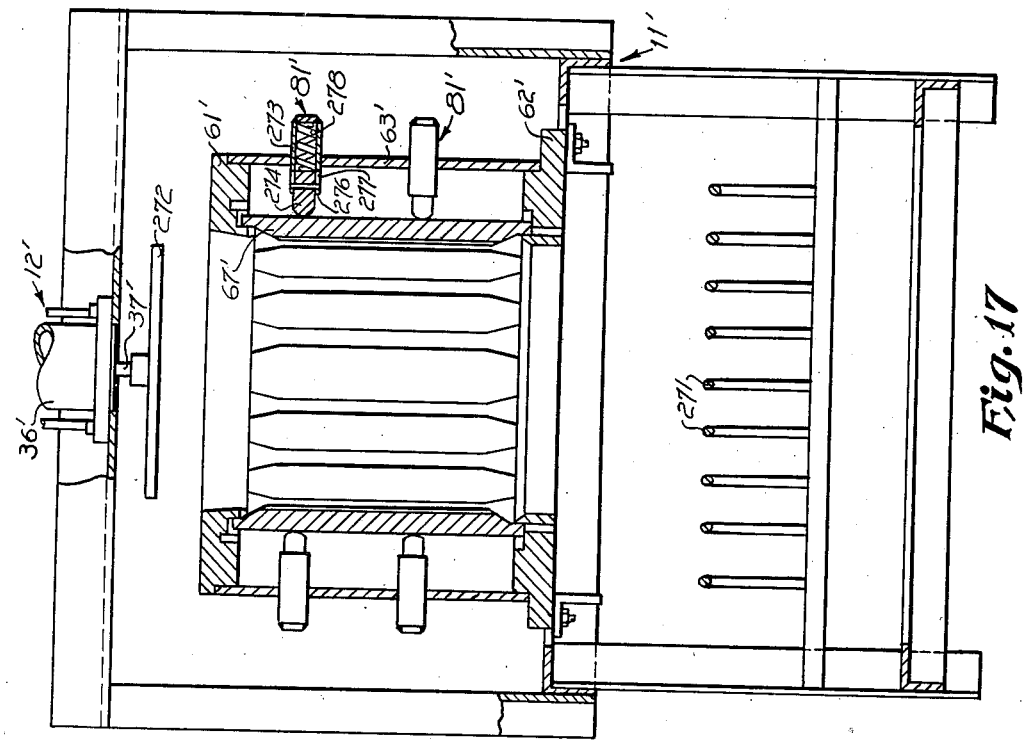
Fig. 17 is a vertical section taken on line 17—17 of Fig. 16.
Figure 16:
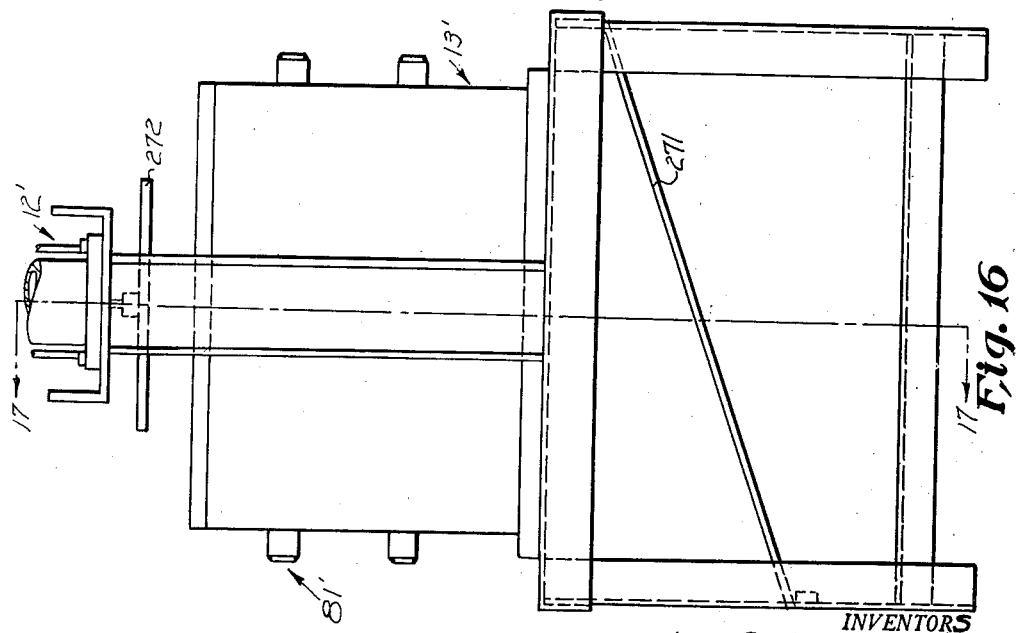
Fig. 16 is a side elevation of a modified finishing apparatus.

In some instances, it may not be necessary or desirable to utilize an inside facing finishing unit. In this event, the apparatus may be considerably simplified and in Figs. 16 and 17, we have illustrated such a modification. In these figures, we have illustrated an article advancing unit 12' and an outside facing finishing unit 13'. These units are mounted upon a frame 11' in a manner similar to that of the apparatus of Figs. 4-9. It is to be observed that there is no article ejecting unit or inside facing finishing unit provided, but that there is substituted therefor a discharge chute formed by the inclined rods 271 which are secured at their ends to the frame 11'.

The article advancing unit 12' comprises an air cylinder 36' and piston rod 37'; however, the article advancing ram merely comprises a flat circular plate 272. The outside facing finishing unit 13' is constructed in a similar manner to the unit 13 of the apparatus of Figs. 4-9 and comprises a plurality of shoes 61' resiliently mounted between the end plates 61' and 62' of the outer supporting member. In the embodiment illustrated, two spring pressure means 81' are provided for each shoe, but it is apparent that only one may be used in the same manner as that shown in Fig. 5. Each spring means comprises a tubular housing 273 welded to the shell 63' and slidably receiving the plunger 274 which is provided with a pin 276 for reception in slots 277 in the housing 273. A spring 278 urges the plunger 274 inwardly and presses the shoe forwardly.

Operation of this modification is relatively simple since it is merely necessary to drop a ring into place in the unit 13' and advance the plate 272 to progress the bimetallic article through the unit 13'. After the article has passed through the unit, it falls downwardly onto the inclined rods 271 and slides out of the machine into a suitable receiving receptacle.

While the forms of construction which have been shown and described are such as are preferred, it should be understood that various modifications of the constructions disclosed are contemplated. For example, the apparatus could be disposed horizontally on its side instead of vertically as shown. In this case, the article on being stripped from the inner facing finishing member would be permitted to fall by gravity from the machine, thus, eliminating the necessity for an ejector unit.

It is also apparent that the apparatus is adapted to finish bimetallic articles having a facing on one face of the core only and that this facing need not overlap or be coextensive with all portions of the periphery of the core. Furthermore, the contour of the surface defined by the rough faces of the shoes may readily be designed so that articles of non-circular and irregular shape may be finished. The article may have lugs on the outer periphery as shown or they may be disposed on the inner periphery. In this latter case, the shoes of the inner facing unit would be spaced apart to provide longitudinal slots for reception of the lugs, while the shoes of the outer finishing unit would meet on inclined lines.

While we have illustrated only an annular article adapted for use in a brake, it is apparent that the apparatus is suitable for treating any similar bimetallic article whether annular or not and whether it is to be used as a bearing or other machine element. Accordingly, it should be recognized that various modifications may be made within the bounds of the following claims.

We claim:

1. Apparatus for finishing the peripheral edge of the facing of a bimetallic article of the type having a facing of sintered powdered metal bonded to the face of a core of solid metal comprising a supporting member; a peripheral series of elongated shoes having rough inner faces; resilient means mounting said shoes on said supporting member in such position that said rough faces cooperate to define a rough elongated surface having a shape in cross section substantially the same as the contour of the outer periphery of the core, said resilient means comprising guide and stop means whereby each shoe is mounted for limited transverse and tilting movement in a plane including the longitudinal axis of the shoe and at right angles to its face; and means for relatively moving said article and supporting member with the face of the article substantially at right angles to the faces of said shoes and the edge of the facing in contact with the rough faces of the shoes.

2. In an apparatus of the class described, a supporting member; a peripheral series of elongated shoes having rough inner faces and being so disposed that said faces cooperate to define a chamber; resilient means supporting said shoes on said supporting member and comprising spring and guide members so constructed and arranged as to mount each shoe for lateral and tilting movement in a plane including the center of said chamber; and article advancing means including an axially reciprocable ram disposed at one end of said supporting member.

3. Apparatus for finishing the edge of the facing of a bimetallic article of the type having a facing of sintered powdered metal bonded to the face of a core of solid metal comprising a supporting member; a peripheral series of shoes disposed within said supporting member and having rough inner faces cooperating to define a rough elongated surface having a shape in cross section substantially the same as the contour of the outer periphery of the core; said supporting member comprising spaced guide members loosely receiving and guiding extensions of said shoes; spring means for urging said shoes and rough faces inwardly, whereby each shoe is mounted for resilient tilting and transverse movement in a plane including the axis of said shoe and at right angles to the rough face thereof; and means for relatively moving said article and said surface with the face of the article substantially at right angles to the rough faces of said shoes.

4. In an apparatus of the class described, a supporting member comprising a first guide member having a series of radial guide slots and a second guide member spaced from said first guide member and provided with a corresponding series of radial guide slots; a plurality of elongated shoes having rough faces, said shoes having extensions at the ends thereof loosely received in said slots to mount the shoes for movement in the radial planes of the slots with the rough faces of the shoes disposed at right angles to the slots; resilient means carried by said supporting member and engaging each shoe to urge the shoe and the rough face of the same forwardly, whereby each shoe is mounted for resilient transverse and tilting movement in a plane including the longitudinal aixs of the shoe and at right angles to the rough face thereof; the rough faces of said elongated shoes cooperating to define a substantially continuous elongated abrading surface.

5. In an apparatus of the class described, a supporting member; a peripheral series of elongated shoes having rough inner faces and being so disposed that said faces cooperate to define a chamber; resilient means supporting said shoes on said supporting member for movement toward and from said chamber; an inner supporting member; a peripheral series of elongated shoes having rough outer faces and being so disposed that said faces cooperate to define a surface of less cross sectional area than said chamber, said surface being axially aligned with said chamber; resilient means supporting said second named series of shoes on said inner member for yielding lateral movement; means mounting said supporting members for relatively axial movement whereby said surface can be disposed within said chamber to define an annular passage having rough surfaces; and article advancing means including an axially reciprocable ram disposed at one end of said supporting member.

6. Apparatus for finishing the edges of the facing of a bimetallic article of the type having a facing of sintered powdered metal bonded to the face of an annular core of solid metal comprising a stationary outer member resiliently carrying a peripheral series of shoes having rough inner faces, said faces cooperating to define an elongated chamber having a shape in cross section substantially the same as the contour of the outer periphery of the face of the core; a movable, axially aligned inner member resiliently carrying a peripheral series of shoes having rough outer faces, said last mentioned faces cooperating to define an elongated surface having a shape in cross section substantially the same as the contour of the inner periphery of the face of the core; means disposed at one end of said outer member for advancing said article through said chamber with the face thereof substantially at right angles to the faces of the shoes; and means for advancing and retracting said inner member with respect to the outer member from a position at the end opposite said article advancing means to a position inside said outer member.

7. The apparatus of claim 6 including timing means for controlling the operation of said inner member advancing means whereby said inner member is advanced to meet said article after said article advancing means has advanced said article substantially midway of said outer member.

8. The apparatus of claim 6 including a stationary stripping member located between the retracted position of the inner member and the outer member and in the path of movement of the article and adapted to strip the article from the inner member as the same is retracted.

9. The apparatus of claim 6 in which the resilient mounting of said shoes comprises a series of springs and guide members so constructed and arranged as to mount each shoe for movement in a direction toward and away from the path of movement of the article and for tilting movement in a plane including the path of movement of the article.

10. The apparatus of claim 6 including a stationary stripping member located in the path of movement of the article and between the outer member and the inner member in its retracted position and adapted to strip the article from the inner member as the inner member is retracted; and ejector means for ejecting the stripped article from the apparatus.

11. The apparatus of claim 6 including a stationary stripping member located in the path of movement of the article and between the outer member and the inner member in its retracted position and adapted to strip the article from the inner member as the inner member is retracted; and ejector means for ejecting the stripped article from the apparatus, said ejector means being operatively connected to said inner member whereby retraction of said inner member operates said ejector means.

12. Apparatus for finishing the edges of the facing of a bimetallic article of the type having a facing of sintered powdered metal bonded to the face of an annular core of solid metal provided with spaced peripheral lugs comprising a stationary outer member resiliently carrying a peripheral series of elongated shoes having rough inner faces, said faces cooperating to define an elongated chamber having a shape in cross section substantially the same as the contour of the outer periphery of the face of the core; a movable, axially aligned inner member resiliently carrying a peripheral series of elongated shoes having rough outer faces, said last mentioned faces cooperating to define an elongated surface having a shape in cross section substantially the same as the contour of the inner periphery of the face of the core; means disposed at one end of said outer member for advancing said article through said chamber with the face thereof substantially at right angles to the faces of the shoes; and means for advancing and retracting said inner member with respect to the outer member from a position at the end opposite said article advancing means to a position inside said outer member; the rough faces of the shoes of one of said series being spaced apart peripherally to define longitudinal slots for the reception of the lugs of the article, and the edges of the rough faces of said other series of shoes substantially meeting in lines inclined in the plane of said faces.

13. The apparatus of claim 12 including a stationary stripping member located in the path of movement of the article and between the outer member and the retracted position of the inner member.

14. In an apparatus of the class described, an outer supporting member; a peripheral series of shoes resiliently carried by said outer member and having rough inner faces cooperating to define a chamber; an inner supporting member; a peripheral series of shoes resiliently carried by said inner member and having rough outer faces cooperating to define a surface of less cross-sectional area than said passage, said surface being axially aligned with said chamber; article advancing means including a reciprocating ram operatively connected to a fluid-operated cylinder and piston mounted at one end of said outer member; means including a second fluid-operated cylinder and piston mounting said inner member for reciprocating axial movement whereby said surface can be disposed within said chamber and cooperate therewith to define an annular passage having rough surfaces; a stationary stripping member having an opening of area slightly greater than the cross-sectional area of said inner member disposed between the outer member and the retracted position of the inner member; a blower pipe disposed between said outer member and said stripping plate and provided with a plurality of apertures directed toward said plate; and control means adapted to supply fluid under pressure to said cylinders to advance and retract the article advancing ram and the inner member in timed relation, and including connections whereby the fluid exhausted from at least one of said cylinders is supplied to said blower pipe and discharged through the apertures thereof.

15. The apparatus of claim 14 including ejector means comprising at least one arm mounted on said stripping member for movement thereover, said arm being operably connected to said inner member whereby movement of the inner member moves the arm over the stripping member.

16. In an apparatus of the class described an outer supporting member; a resilient, elongated, outer, abrading surface carried by said supporting member, said surface comprising a peripheral series of elongated rough faces; an inner supporting member; a resilient, elongated, inner, abrading surface carried by said inner supporting member, said surface comprising a peripheral series of elongated, rough faces, said inner surface being of less cross-sectional area than said outer surface and being axially aligned therewith; article advancing means including a reciprocating ram operatively connected to a cylinder and piston mounted at one end of said outer member; and means including a second fluid-operated cylinder and piston mounting said inner member for reciprocating axial movement whereby said inner surface can be disposed within and in spaced relation to said outer surface to define an annular passage having rough surfaces.

17. A friction shoe of T-shaped cross section comprising an elongated face portion having a rough face and forming the head of the T; an elongated reinforcing portion forming the stem of the T and located on the opposite side of the face portion from the rough face; said rough face being curved both transversely and longitudinally; and said reinforcing portion having an extension at each end thereof beyond the length of the first mentioned portion.

LEO S. KUPERSMITH.
CHARLES F. WIRT.